Sept. 22, 1931.  D. W. WELLS  1,824,250
AIRSHIP
Filed Nov. 5, 1928   2 Sheets-Sheet 1

Inventor
Don W. Wells.
By Lyon & Lyon
Attorneys

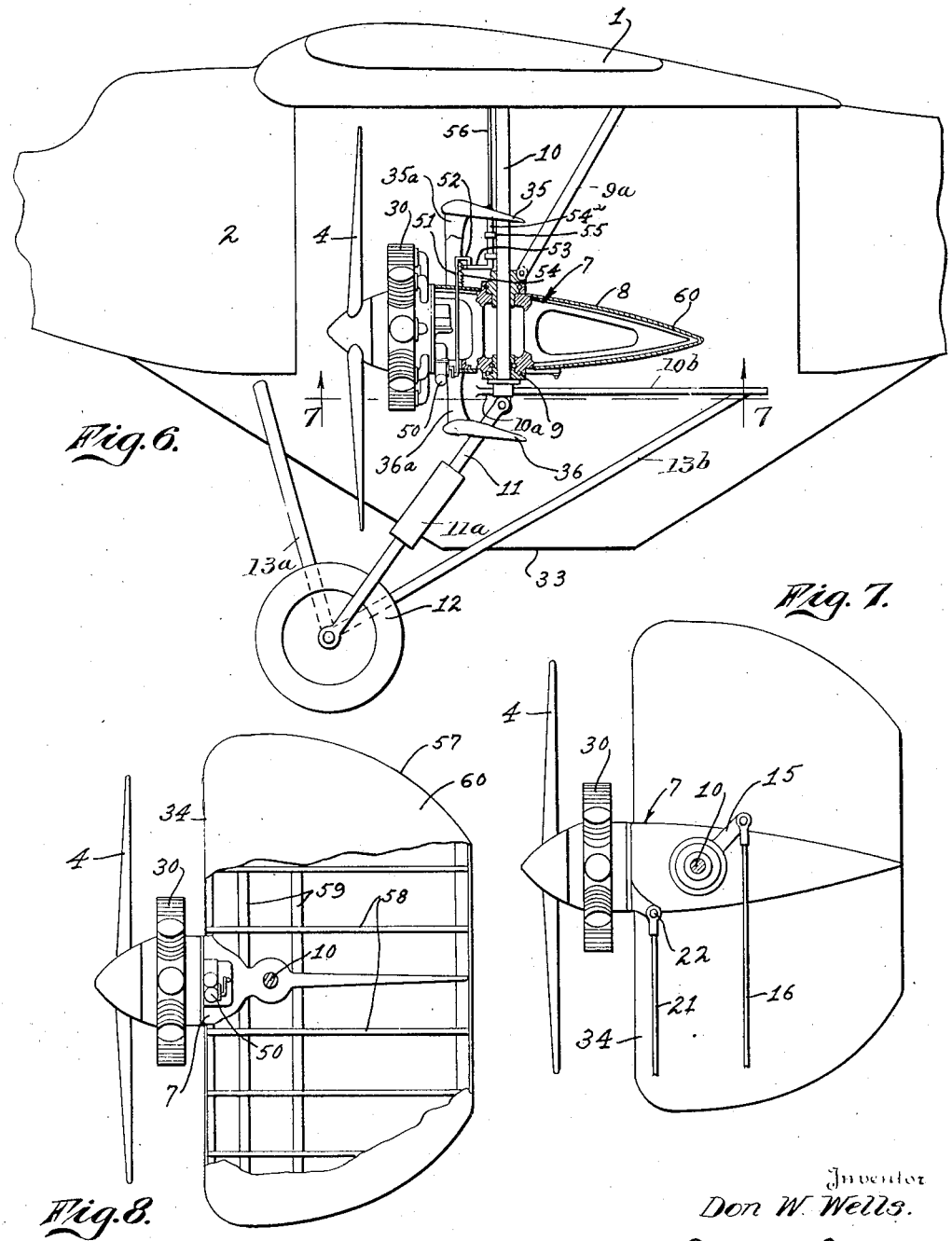

Patented Sept. 22, 1931

1,824,250

UNITED STATES PATENT OFFICE

DON W. WELLS, OF LOS ANGELES, CALIFORNIA, ASSIGNOR OF ONE-HALF TO GEO. W. ANDERSON, OF LOS ANGELES, CALIFORNIA

AIRSHIP

Application filed November 5, 1928. Serial No. 317,172.

This invention relates to an airship or flying machine. One of the objections to aeroplanes is that they must be moving at a high speed in order to be readily controllable. It has been attempted heretofore to employ the helicopter principle in connection with aeroplanes but the helicopter construction has not been found entirely satisfactory when used with aeroplanes, and it appears to be undesirable in aeroplane construction to employ a propeller rotating on a vertical shaft. The general object of this invention is to provide an airship with means which is capable of use when desired to exert a lifting force on the airship without necessitating a high forward velocity of the airship; also to provide means for this purpose which will operate normally to exert a forward driving force for the airship.

A further object of the invention is to improve the general construction of aeroplanes and to provide the same with auxiliary propellers capable of normally exerting a driving force for driving the aeroplane forward, and which at will can be employed so as to exert a reduced or eliminated forward driving force and exert a lifting force on the aeroplane instead of a forward driving force.

In the preferred embodiment of the invention, I employ a traction propeller mounted to rotate on a substantially horizontal axis but capable of being oriented in a substantially horizontal plane into a position in which the current of air developed by the propeller moves transversely to the front-and-rear axis of the aeroplane. One of the objects of the invention is to provide improved means for mounting such a propeller and for providing means associated therewith to exert a lifting force on the aeroplane.

A further object of the invention is to produce an aeroplane capable of maintaining itself in flight at a relatively low speed and capable of developing a relatively low landing speed during which the aeroplane will be in complete control; also to provide an aeroplane capable of hovering aloft at a relatively low speed. This feature is most desirable in aeroplanes used for observation purposes.

Further objects of the invention will appear hereinafter.

The invention consists of the novel parts and combination of parts to be described hereinafter, all of which contribute to produce an efficient airship.

A preferred embodiment of the invention is described in the following specification, while the broad scope of the invention is pointed out in the appended claims.

Figures 4, 5:
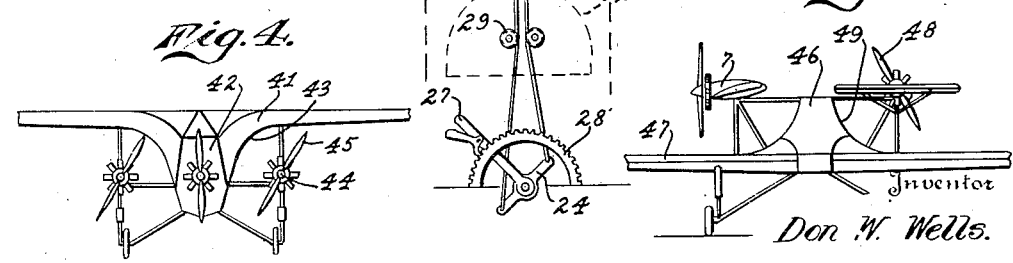
Figure 4 is a view similar to Figure 1 with the outer ends of the wings broken away and illustrating another embodiment of the invention which enables the head resistance to be reduced.

Figure 5 is a front elevation of an aeroplane embodying my invention showing another embodiment of the same in which my propellers are located above the wing and fuselage. This view shows one of the propellers in an oriented position and the other propeller in its normal front-and-rear position. This, however, is not a relation which would be used in flight.

Figure 6 is a vertical section taken through one of my propeller brackets and particularly illustrating the general features of its construction and also illustrating means for maintaining control of the engine carburetor in the abnormal or oriented positions of the propeller.

This view indicates other parts of the aeroplane, some of which are broken away.

Figure 7 is a bottom plan of one of my propeller brackets and a propeller and engine, and may be considered a horizontal section on the line 7—7 of Figure 6, looking upwardly.

Figure 8 is a view similar to Figure 7 but showing part of the covering of the propeller bracket broken away to illustrate the framing of the propeller bracket. This view also illustrates further the means for maintaining control of the carburetor of the engine in oriented positions of the propeller bracket.

Before proceeding to a detailed description of the invention, it should be stated that my invention involves the use of a propeller rotating normally on a horizontal axis disposed in a front-and-rear direction, that is to say, parallel with the longitudinal central axis of the aeroplane or airship on which my improvement may be employed. I prefer to employ two such propellers located on opposite sides of the central axis of the airship and mounted in such a way that at will the propeller shafts may be swung around into an oriented position transverse to the central axis of the airship. In using the word "transverse", I mean it to include not only a position at right angles to the central axis of the airship, but also any intermediate inclined position. When the axis of the propeller shaft is located at right angles to the central axis of the airship, a relatively great lifting force will be exerted with a relatively small or eliminated forward impelling force. In intermediate or inclined positions, the forward driving force will become reduced in an indirect ratio with the lifting force exerted on the airship.

The invention may be embodied in different types of construction and it may be used on dirigibles for maneuvering them or assisting in propelling them and for increasing the lifting force upon them when desired. In the present specification, the preferred embodiment of the invention is illustrated in Figures 1, 2, 3 and 6. In this type of construction, 1 represents the wing of a monoplane provided with a fuselage 2 forward of which a main propeller 3 is provided, the shaft of which is located in a front-and-rear direction on the central axis of the aeroplane.

In applying my invention to such an aeroplane, I provide two auxiliary traction propellers 4 which are located on opposite sides of the central axis of the aeroplane and at equal distances from it. These propellers are mounted so that their shafts 5 extend in a substantially horizontal plane and in a front-and-rear direction so that they are normally substantially parallel with the axis of the shaft 6 of the main propeller 3.

Figure 2:
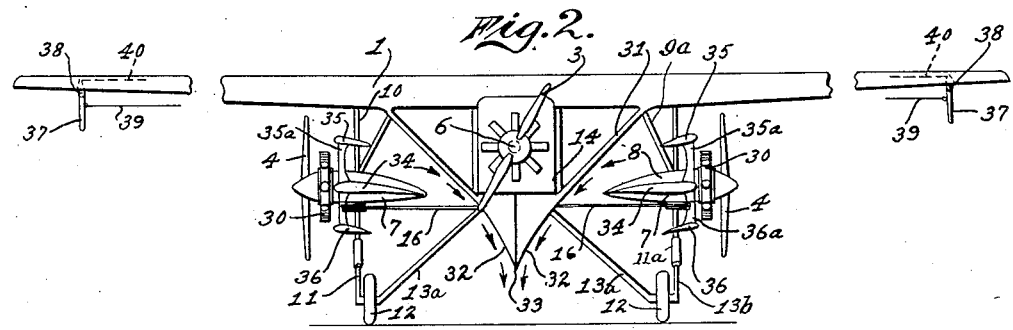
Figure 2 is a view similar to Figure 1, but showing the aeroplane with its propellers in a position for driving the same at a relatively low speed, at the same time exerting a lifting force upon the aeroplane.
Figure 3:
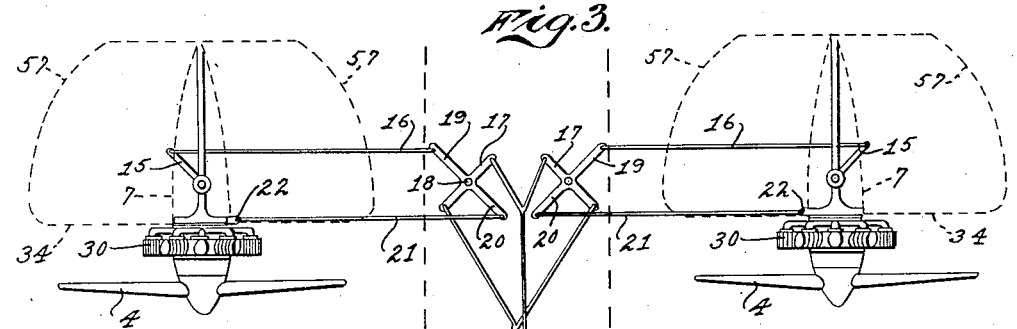
Figure 3 is a plan upon an enlarged scale of a diagrammatic nature further illustrating the construction and arrangement of the controlling means for the auxiliary propellers.

In practicing my invention, I mount these propellers 4 so that they can be swung around into an oriented position such as that illustrated in Figure 2. In order to accomplish this, I mount each propeller 4 at the forward end of a propeller bracket 7, said bracket having an elongated framed body 8 with a covering so that it may operate as an auxiliary wing. This bracket 7 is provided with ball bearings 9 supporting it for rotation on a vertical bar or stanchion 10 that extends down from the wing 1. The lower end of this stanchion 10 is braced from the fuselage by two horizontal braces $10^a$ and $10^b$. From the lower end of the stanchion a brace 11 with a landing shock absorber $11^a$ extends down to the axles of the wheels 12, said axles being braced by diagonal braces $13^a$ and $13^b$. At the upper bearing 9, a diagonal strut $9^a$ braces the stanchion to the rear portion of the wing.

Figure 1:
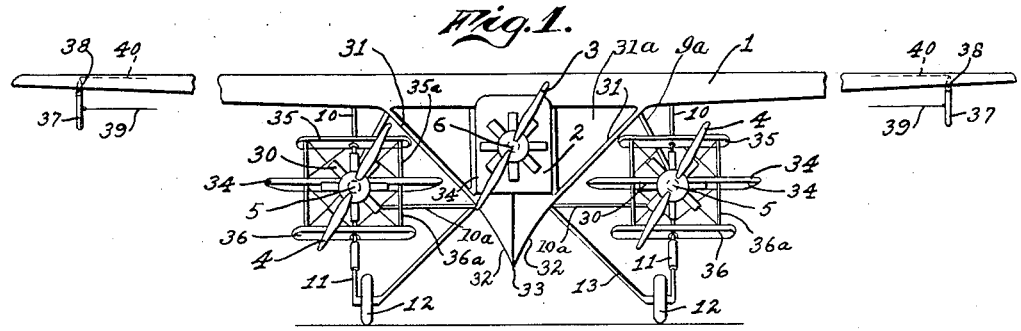
Figure 1 is a front elevation of the aeroplane embodying my invention, the outer portion of the wing being broken away.

Each bracket 7 is provided with controlling means for swinging it at will from the normal position shown in Figure 1 into an oriented position such as that shown in Figure 2. In order to accomplish this, each bracket 7 is provided with a rigid arm 15 connected with a drag line or cord 16. These cords 16 are attached to cross-heads 17 (see Fig. 3) having pivots 18 on the under side of the fuselage 2. These cross-heads have four arms, including arms 19, attached to the cords 16 and opposite arms 20 that are attached to opposite cords 21 that are attached at 22 to the inner sides of the propeller brackets.

The cross-heads 17 may be rocked at will in equal amounts by two cords or wires 23 bifurcated at their rear ends to attach to the cross-heads, their forward ends being attached to oppositely disposed arms 24 on a rock lever within reach of the pilot sitting on a seat indicated by the dotted line 25. This cross-head 24 is actuated by a hand lever 27 at any point on the circumference of a quadrant 28.

The cords 23 may be guided wherever necessary by means of suitable grooved pulleys 29.

The forward end of each propeller bracket may carry a motor or engine 30 which may be a gas engine or other suitable engine. In the normal position of the propellers 4, as indicated in Figure 1, they are rotated by their engines in a direction so that they assist in driving the aeroplane forward. When it is desired to utilize their power to exert a lifting force on the aeroplane, they are moved around by the lever 27 to a position such as that shown in Figure 2. When in this position, the propellers 4 direct an air current, as indicated by the arrows, flowing in an inward direction toward the fuselage. In accordance with my invention, I provide the airship with means located in the air current and reacting to the air current to exert a lifting force on the ship. In the present instance I provide the aeroplane with an inclined surface or lifting wing 31. There is one of these surfaces 31 corresponding to each propeller 4 and disposed between it and the fuselage. The lower ends of the inclined surfaces 31 terminate in curves 32 that come together in a point or edge 33 projecting downwardly on the under side of the aeroplane.

Additional means for this general purpose may be provided as will now be described.

If desired, the elongated body 8 of the propeller bracket may support air-foils including a main air-foil 34 which is of considerable size and is constructed like a small aeroplane wing, being disposed in a substantially horizontal plane (see Fig. 2), and exerting a substantial lifting force in cooperation with the propeller 4. If it is desired to increase the lifting force I employ two other air-foils 35 and 36 supported on the propeller frame 7, one above the same and one below, these air-foils having under faces which incline downwardly to the central axis of the aeroplane when the propellers 4 are in their oriented position (see Fig. 2). The air-foils 35 and 36 are supported on the auxiliary wing 34 by means of vertical plate brackets 35ª and 36ª. When the current of air from the propeller strikes these air-foils 34, 35 and 36, it exerts a lifting force on them.

The air-foils or auxiliary wings 34 may constitute part of the necessary supporting surface or wing area for the aeroplane, and consequently when used, will enable the wing spread or length of the wing 1 to be reduced.

As these airfoils are located in the air stream coming from the propellers 4 they naturally develop considerable lifting power, and if superior hovering effects are desired in the ship, these airfoils would be constructed so that they could be made to present their under faces at a relatively large angle of incidence to the air stream.

If desired, I may provide special ailrons 37 pivoted at 38 on horizontal axes near the tips of the wing 1. These ailrons may be controlled by cords 39 and 40 extending into the pilot's position and may be adjusted into different positions to control the balancing of the aeroplane in lighting. They should extend the full width of the wing and should have considerable depth as shown.

The triangular space 31ª between the inclined surfaces 31 and the side of the fuselage is open so that no surface is presented on this area to offer head resistance.

Instead of having inclined surfaces 31 disposed in a straight line, as shown in Figures 1 and 2, I may provide a construction such as that shown in Figure 4. In this construction, 41 indicates the wing of the aeroplane, which on its under side near the fuselage 42 is provided with concave curved surfaces 43 struck on a radius from the axis 44 of the auxiliary propeller 45. This enables the head resistance to be reduced by eliminating the skin resistance on the sides of the tunnels formed at the triangular spaces 31ª. In other respects the construction would be substantially the same as that described in connection with Figures 1 to 3.

In Figure 5 I illustrate another embodiment of the invention in which the fuselage 46 is placed above the wing 47 of the aeroplane. In this type of construction I provide two auxiliary propellers 48 disposed on opposite sides of the central axis of the aeroplane and mounted so that they can be oriented into a transversely disposed position in accordance with the invention.

Corresponding to each propeller 48 and between it and the central axis of the aeroplane, I provide an inclined or curved surface 49 which inclines outwardly. In this instance the propellers 48 would be pushing propellers instead of the tractor propellers and would be located toward the rear of the aeroplane. They would be mounted on oriented brackets like the propeller brackets 7 but when swung outwardly into their oriented position, they would draw air away from the central axis of the aeroplane above the wing 47 and thereby produce a partial vacuum above the middle point of the wing which would exert a lifting force through the action of the unbalanced air pressure on the under side of the wing.

My invention provides means for maintaining controlling connection with the motor or engine 30 in any position into which the propellers 4 are moved when they are oriented. This type of control which I employ may be used for maintaining control of an ignition distributor on the engine or any other kind of control means. In Figure 6, I illustrate the essential features of my control apparatus as applied for controlling a carburetor 50. The carburetor lever is provided with a link 51 which is guided vertically through the propeller bracket 7 and formed at its upper end with a gooseneck 52, the end of which rests on the edge of quadrant 53. A coil spring 54 (see Figure 6) may be employed for holding the stem or link 51 down against the upper face of the quadrant 53. This quadrant has an angle at the center of more than 90° so as to insure that in any oriented position of the propeller bracket 7 it will maintain itself under the end of the gooseneck 52. The quadrant 53 is carried on a vertically guided stem 54ª that is held against rotation and guided to slide vertically in guide 55 projecting out from the side of the post or stanchion 10. The upper end of the stem 54 is provided with a cord 56 that extends up into the main wing 1 and is guided around guide pulleys over to the pilot's position. This part of the cord 56 and the guide pulleys now referred to are not illustrated.

The ends or edges 57 of the auxiliary wings 34 or air-foils 34 are preferably struck on an arc having its center on the axis of the stanchion 10 (see Figs. 7 and 8). This insures proper clearance for these wings when the auxiliary propellers 4 are swung around into their oriented position.

The auxiliary wings 34 may have a frame structure like an ordinary aeroplane wing including fore-and-aft or longitudinal frames 58 connected to two laterally extending frames 59. These frames are enveloped in a suitable covering 60. The auxiliary wings 34 may have any suitable shape but preferably have substantially the profile indicated in the outline in Figure 2.

The controlling means for the propeller brackets should, of course, be constructed so that the movements of both propeller brackets will be through precisely the same angle. This is necessary so as to preserve proper balance of the lifting forces exerted by the two propellers. By setting the propeller brackets so that the shafts of the auxiliary propellers are in an inclined position, for example 45°, the aeroplane can be made to advance at a relatively slow speed but will be kept at its elevation by the lifting force exerted upon the lifting surfaces 31.

One effect of placing the propellers at an inclined angle is to increase the velocity of the slip stream along the side of the fuselage and passing to the elevator and rudder. This increase of velocity increases the effectiveness of the rudder and elevator in spite of the slower advance of the ship. This is most desirable, enabling the equilibrium to be nicely controlled in hovering or landing.

The main propeller 3 may be omitted if it is desired to construct the ship to be driven by two propellers swinging on propeller brackets.

It is understood that the embodiment of the invention described herein is only one of the many embodiments this invention may take, and I do not wish to be limited in the practice of the invention, nor in the claims, to the particular embodiment set forth.

What I claim is:

1. In an airship, the combination of a frame, a pair of propellers for driving the airship forward mounted on opposite sides of the central axis of the frame, each propeller having a shaft mounted to rotate on an axis substantially parallel with the said central axis, means for supporting the propellers on the frame to enable the same to be oriented in a substantially horizontal plane into a position with the propeller shafts transverse to the said central axis of the airship, and means including inclined surfaces receiving the air current from the propellers in their oriented position and exerting a lifting force on the airship.

2. In an airship, the combination of a pair of propeller brackets pivotally mounted respectively on a substantially vertical axis on the frame on opposite sides of the central axis of the frame, each propeller bracket having a shaft with a traction propeller mounted in its bracket to rotate normally on an axis substantially parallel with said central axis of the frame, means operatable at will to swing the propeller brackets on their pivots to move the propeller shafts in a substantially horizontal plane into oriented positions transverse to the said central axis of the airship, and means including inclined surfaces receiving the air current from the propellers in their oriented position and exerting a lifting force on the airship.

3. In an airship, the combination of a frame, a pair of propeller brackets pivotally mounted on the frame on opposite sides of the central axis of the frame, each propeller bracket having a shaft mounted in the bracket to rotate normally on an axis substantially parallel with said central axis of the frame, means operatable at will to swing the propeller brackets on their pivots to move the propeller shafts into oriented position transverse to the said central axis of the airship, said frame having an inclined surface corresponding to each propeller and located between the same and the said central axis of the airship, and inclining downwardly toward the central axis of the machine and operating to receive the air currents from the propellers in their oriented position to exert a lifting force on the airship.

4. In an aeroplane, the combination of a transverse wing, a main propeller mounted with its shaft disposed in a front-and-rear direction substantially on the central axis of the aeroplane, a pair of propellers mounted respectively on opposite sides of said central axis, having shafts normally disposed substantially parallel with the shaft of the first named propeller so that the pair of propellers can exert a traction effect, means for supporting the shafts of the second named propellers to enable the same to be oriented in a substantially horizontal plane into a transverse position with respect to the said central axis of the aeroplane, and means cooperating with the last named propellers in their oriented position to exert a lifting force on the aeroplane.

5. In an aeroplane, the combination of a transverse wing, a fuselage disposed in a front-and-rear direction below the wing, a main propeller having a shaft mounted to rotate at the forward end of the fuselage, and located substantially on the central axis of the aeroplane, a pair of auxiliary propellers disposed respectively on opposite sides of said central axis of the aeroplane having shafts mounted to rotate normally in a position substantially parallel with the said central axis of the aeroplane, means for supporting said last named shafts to enable the same to be oriented in a substantially horizontal plane into a position transverse to the said central axis of the aeroplane and in which the said pair of propellers will direct an air current toward the fuselage, said aeroplane having inclined surfaces corresponding respectively to the said auxiliary propellers, located respectively between their corresponding propeller and the fuselage, said inclined surfaces inclining downwardly toward the fuselage and operating to exert a lifting force on the aeroplane when the auxiliary propellers are in their oriented position.

6. In an aeroplane, the combination of a transverse wing, a fuselage disposed in a front-and-rear direction below the wing, a main propeller having a shaft mounted to rotate at the forward end of the fuselage, and located substantially on the central axis of the aeroplane, a pair of auxiliary propeller brackets pivotally mounted on the aeroplane respectively on opposite sides of said central axis of the aeroplane, auxiliary propeller shafts mounted on the propeller brackets respectively so as to rotate normally in a position substantially parallel with the said central axis of the aeroplane, auxiliary propellers carried by the said auxiliary propeller shafts, means operatable at will to swing the auxiliary propeller brackets on their pivots to bring the auxiliary propellers into oriented position with their shafts extending transversely through the said central axis of the aeroplane so that the auxiliary propellers would direct the air current toward the fuselage, said aeroplane having inclined surfaces corresponding respectively to the said auxiliary propellers located respectively between their corresponding propeller and the fuselage, inclining downwardly toward the fuselage and operating to exert a lifting force on the aeroplane when the auxiliary propellers are in their oriented position, and air-foils carried by the propeller brackets and presenting inclined under faces cooperating with the current from the auxiliary propellers to exert a lifting force.

7. In an airship, the combination of a frame, a pair of propellers mounted on opposite sides of the central axis of the frame, a propeller bracket corresponding to each propeller and pivotally mounted on a substantially vertical axis on the frame, a shaft corresponding to each propeller mounted on its corresponding propeller bracket and normally disposed with its axis substantially parallel with the said central axis of the frame, means connecting the propeller brackets for swinging the propeller brackets in unison in opposite directions on their pivots to orient the same in a substantially horizontal plane into a position with the propeller shafts transverse and making substantially equal angles with the said central axis of the airship, and lifting surfaces cooperating with the propellers to exert a lifting force on the airship.

8. In an airship, the combination of a frame, a pair of propellers mounted on opposite sides of the central axis of the frame, each propeller having a shaft mounted to rotate on an axis substantially parallel with the said central axis of the airship, means for supporting the propellers on the frame, means connecting the propellers to enable the same to be oriented in unison into a position with the propeller shafts transverse to and making substantially equal angles with the said central axis of the airship, and air-foils associated with the propellers so as to move therewith when the propeller shafts are oriented, said air-foils cooperating with the propellers to exert a lifting force on the aeroplane.

9. In an airship, the combination of a frame, a propeller bracket mounted on the frame to swing on a substantially vertical axis, said propeller bracket having an engine and propeller mounted thereon to rotate on a substantially horizontal axis, means for rotating the propeller bracket on the vertical axis to move the same into an oriented position in a substantially horizontal plane and hold the same in such position with the axis of rotation of the propeller more or less transverse to the axis of the airship, thereby propelling the ship forward at a reduced speed, and means cooperating with the propeller to exert a lifting force on the airship.

10. In an airship, the combination of a frame, a propeller bracket mounted on the frame to swing on a substantially vertical axis, an engine and propeller mounted on the bracket to rotate on a substantially horizontal axis, air-foils mounted on the propeller bracket in a position to receive the air current from the propeller, means for holding the propeller bracket normally in a position with the axis of rotation of the propeller in a front-and-rear direction, and means for swinging the propeller bracket in a substantially horizontal plane into an oriented position with the axis of rotation of the propeller transverse to the fore-and-aft line, said air-foils cooperating with the propeller to exert a lifting force on the airship.

11. In an airship, the combination of a frame, a pair of propellers mounted on opposite sides of the central axis of the frame, each propeller having a shaft mounted to rotate on an axis substantially parallel with the said central axis, means for supporting the propellers on the frame to enable the same to be oriented into a position with the propeller shafts transverse to the said central axis of the airship, and lifting surfaces receiving the air current from the propellers in their oriented positions and exerting a lifting force on the airship.

Signed at Los Angeles, California, this 29th day of October, 1928.

DON W. WELLS.